United States Patent
Cruz-Albrecht et al.

(10) Patent No.: US 9,262,843 B1
(45) Date of Patent: Feb. 16, 2016

(54) TIME ENCODED BASED NETWORK FOR IMAGE PROCESSING

(71) Applicant: HRL Laboratories, LLC, Malibu, CA (US)

(72) Inventors: Jose Cruz-Albrecht, Oak Park, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 91 days.

(21) Appl. No.: 14/202,200

(22) Filed: Mar. 10, 2014

(51) Int. Cl.
  *G06K 9/46* (2006.01)
  *G06T 9/00* (2006.01)

(52) U.S. Cl.
  CPC .................................... *G06T 9/00* (2013.01)

(58) Field of Classification Search
  CPC ........... G06T 9/00; G06T 2207/10016; G06T 7/0083; G06T 7/0081; G06K 9/48; G06K 9/4609
  See application file for complete search history.

(56) References Cited

U.S. PATENT DOCUMENTS

| 5,355,435 A * | 10/1994 | DeYong ................. G06N 3/049 706/26 |
| 7,822,698 B1 | 10/2010 | Cruz-Albrecht et al. |
| 2002/0038294 A1* | 3/2002 | Matsugu ............. G06K 9/4628 706/20 |

OTHER PUBLICATIONS

T. Shibata, R. Zhang, S.P. Levitan, D. Nikonov and G. Bourianoff, "CMOS Supporting Circuitries for Nano-Oscillator-Based Associative Memories," Proc. Intl. Workshop on Cellular Nanoscale Networks and their Applications, 2012.

S. P. Levitan, Y. Fang, D. H. Dash, T. Shibata, D. E. Nikonov and G. I. Bourianoff, "Non-Boolean Associative Architectures Based on Nano-Oscillators," Proc. Intl. Workshop on Cellular Nanoscale Networks and their Applications, 2012.

* cited by examiner

*Primary Examiner* — Phuoc Tran
(74) *Attorney, Agent, or Firm* — Ladas & Parry

(57) ABSTRACT

A circuit for detecting features in an image, the circuit including M time encoders, each time encoder having two inputs, $X_i$ and $T_i$, where $X_i$ is an ith element of an input vector $X_1 \ldots X_M$ of the image and $T_i$ is an ith element of a template vector $T_1 \ldots T_M$, and having an oscillatory output, wherein when the input vector $X_1 \ldots X_M$ and the template vector $T_1 \ldots T_M$ are more matched, the oscillatory outputs of the time encoders are more synchronized, and wherein when the input vector $X_1 \ldots X_M$ and the template vector $T_1 \ldots T_M$ are less matched, the oscillatory outputs of the time encoders are less synchronized.

21 Claims, 11 Drawing Sheets

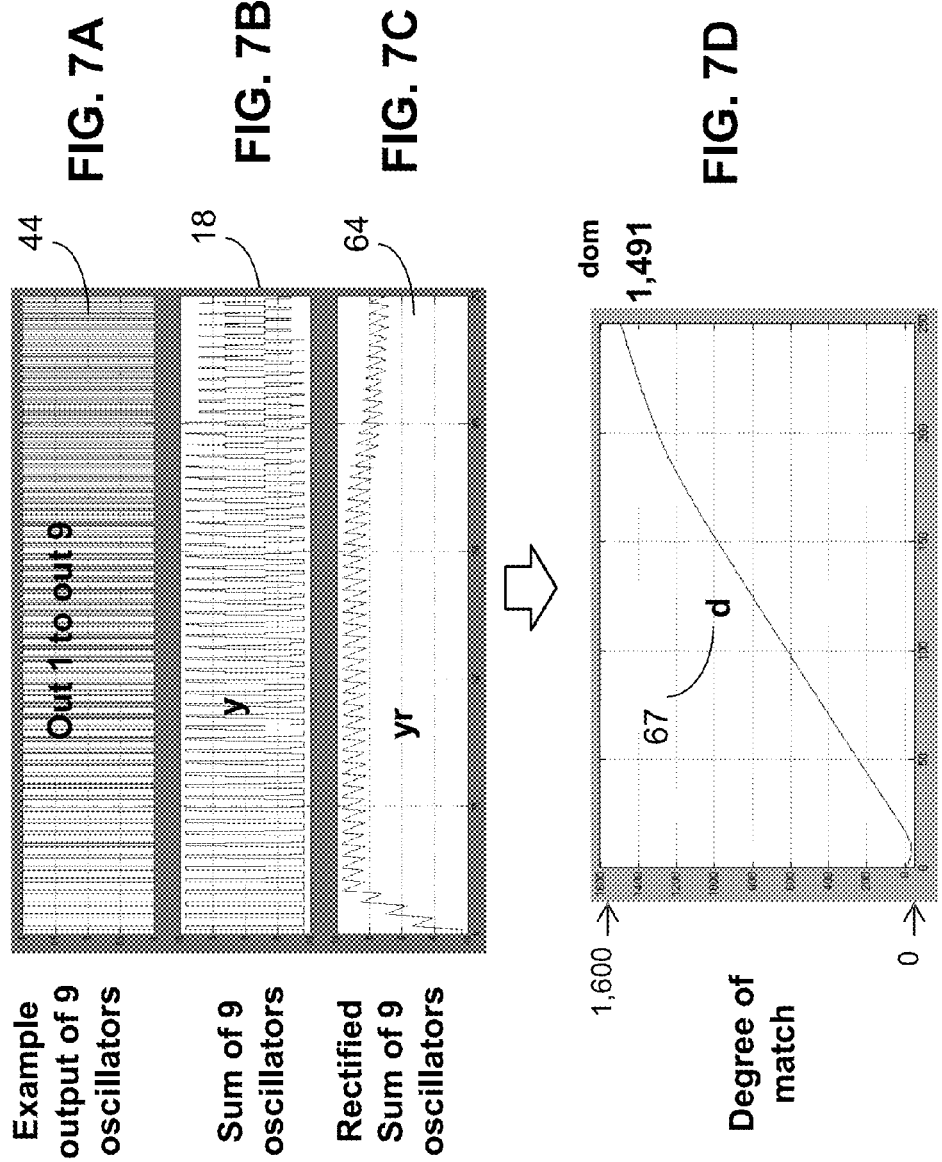

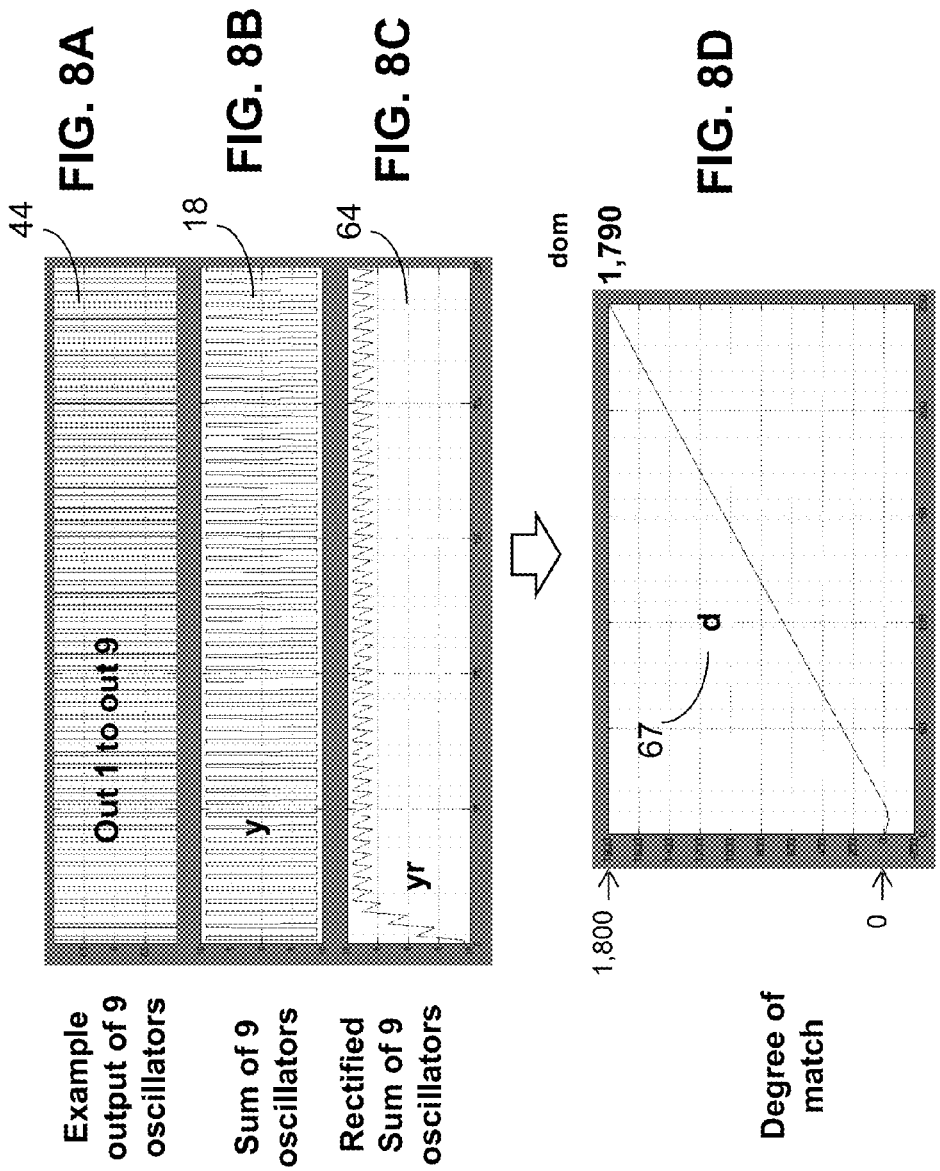

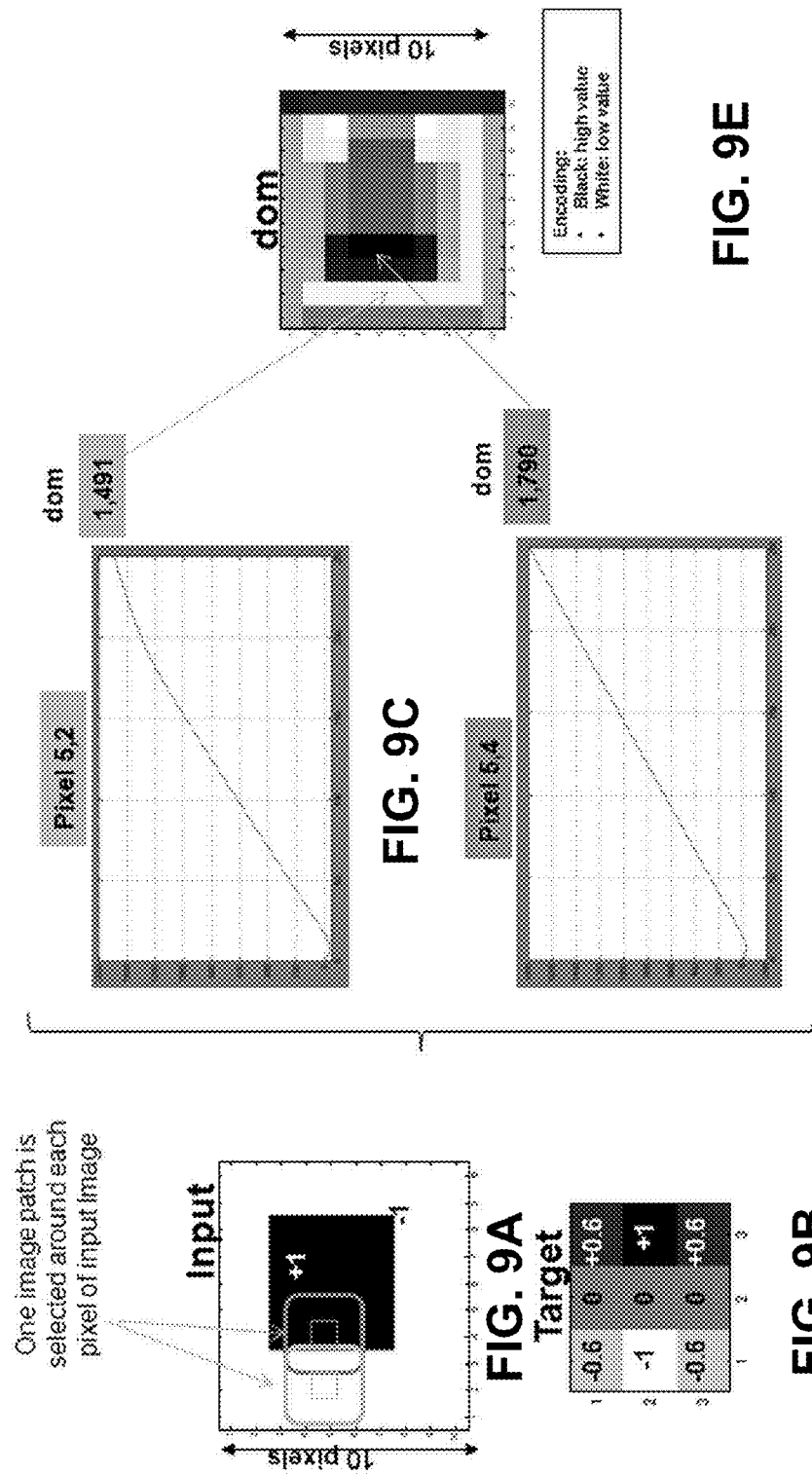

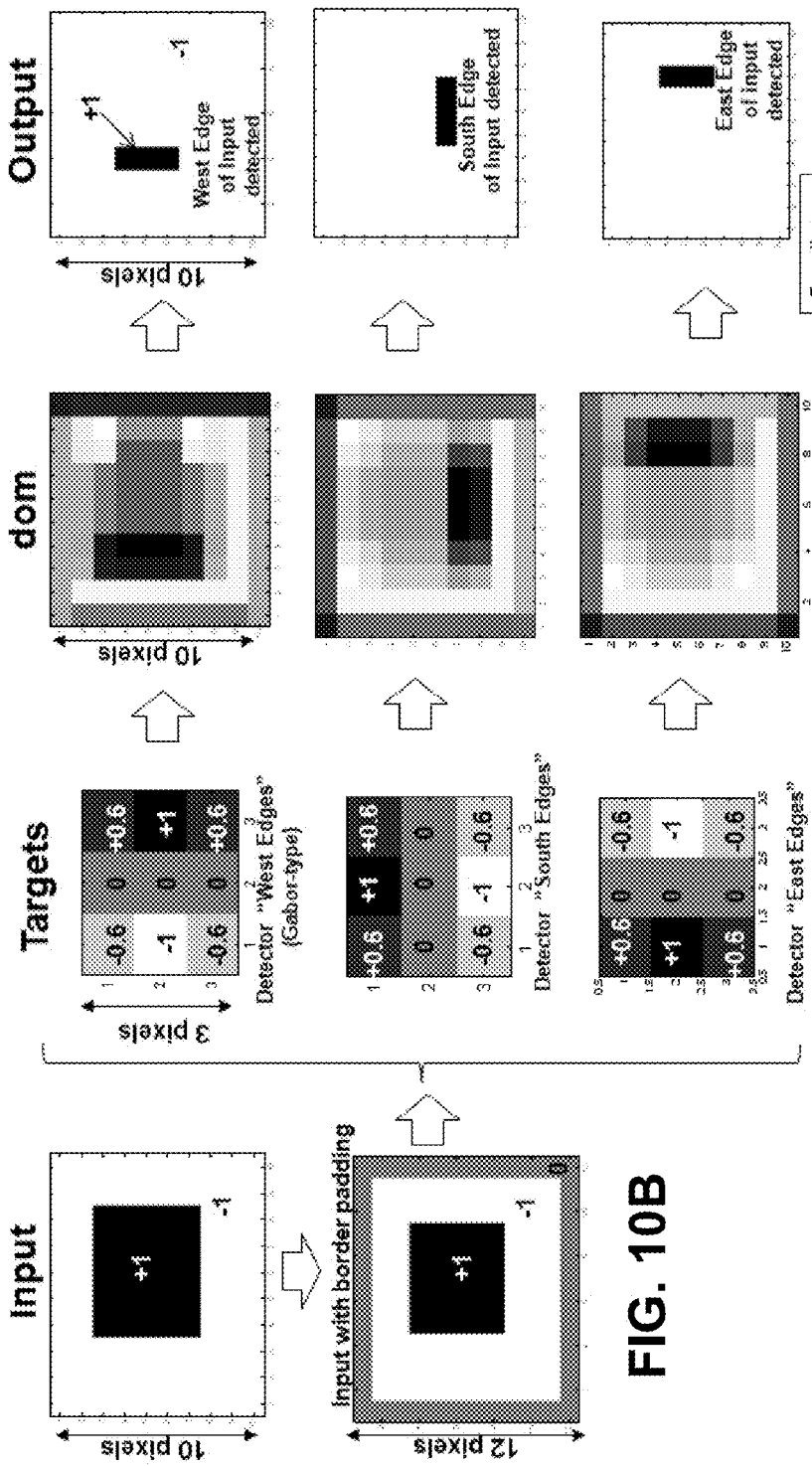

```
┌─────────────────────────────────────────────────────────┐
│ FORMING AN INPUT VECTOR WITH M ELEMENTS X₁-X_M OF   100 │
│ THE IMAGE                                               │
└─────────────────────────────────────────────────────────┘
                            │
┌─────────────────────────────────────────────────────────┐
│ PROVIDING A TEMPLATE VECTOR WITH M ELEMENTS T₁-T_M  102 │
└─────────────────────────────────────────────────────────┘
                            │
┌─────────────────────────────────────────────────────────┐
│ FORMING A M TIME ENCODERS, EACH TIME ENCODER        104 │
│ HAVING TWO INPUTS, X_I AND T_I, WHERE X_I IS AN ITH     │
│ ELEMENT OF THE INPUT VECTOR X₁-X_M AND T_I IS AN ITH    │
│ ELEMENT OF THE TEMPLATE VECTOR T₁-T_M, AND HAVING AN    │
│ OSCILLATORY OUTPUT                                      │
└─────────────────────────────────────────────────────────┘
                            │
┌─────────────────────────────────────────────────────────┐
│ WHEREIN WHEN THE INPUT VECTOR X₁-X_M AND THE        106 │
│ TEMPLATE VECTOR T₁-T_M ARE MORE MATCHED, THE            │
│ OSCILLATORY OUTPUTS OF THE TIME ENCODERS ARE MORE       │
│ SYNCHRONIZED, AND WHEREIN WHEN THE INPUT VECTOR         │
│ X₁-X_M AND THE TEMPLATE VECTOR T₁-T_M ARE LESS          │
│ MATCHED, THE OSCILLATORY OUTPUTS OF THE TIME            │
│ ENCODERS ARE LESS SYNCHRONIZED.                         │
└─────────────────────────────────────────────────────────┘
```

SUMMING TOGETHER EACH TIME ENCODER OUTPUT TO FORMED A SUMMED OUTPUT

CONVERTING THE SUMMED OUTPUT INTO A BINARY SIGNAL THAT IS HIGH WHEN THE INPUT VECTOR $X_1-X_M$ IS MORE CLOSELY MATCHED TO THE TEMPLATE VECTOR $T_1-T_M$ AND THAT IS LOW WHEN THE INPUT VECTOR $X_1-X_M$ IS LESS CLOSELY MATCHED TO THE TEMPLATE VECTOR $T_1-T_M$.

TIME ENCODED BASED NETWORK FOR IMAGE PROCESSING

STATEMENT REGARDING FEDERAL FUNDING

This invention was made in part under U.S. Government UPSIDE contract HR0011 13 C 0052. The U.S. Government has certain rights in this invention.

CROSS REFERENCE TO RELATED APPLICATIONS

None.

TECHNICAL FIELD

This disclosure relates to image processing, and in particular to image feature detection.

BACKGROUND

In image processing applications, the concept of feature detection refers to methods that aim at determining whether there is an image feature of a given type in an image. For example, many computer vision algorithms use feature detection. Image features to be detected may, for example, include edges, corners, ridges, and so on.

Algorithms have been used to detect features in images; however, these algorithms can be very computationally intensive, require expensive circuitry and consume large amounts power.

The present disclosure uses time encoders to perform feature detection. An example of coupled time encoders is described by J. M. Cruz Albrecht and P. Petre, "Spike Domain and Pulse Domain Non Linear Processors," U.S. Pat. No. 7,822,698, issued October 2010; however, the coupling described is different and cannot be used for synchronization as described in the present disclosure. T. Shibata, R. Zhang, S. P. Levitan, D. Nikonov and G. Bourianoff, "CMOS Supporting Circuitries for Nano Oscillator Based Associative Memories," *Proc. Intl. Workshop on Cellular Nanoscale Networks and their Applications*, 2012 describe an oscillator cluster based in inverters; however, time encoders are not used. S. P. Levitan, Y. Fang, D. H. Dash, T. Shibata, D. E. Nikonov and G. I. Bourianoff, "Non Boolean Associative Architectures Based on Nano Oscillators," *Proc. Intl. Workshop on Cellular Nanoscale Networks and their Applications*, 2012 describe idealized oscillator clusters for comparing an input with a template; however, again time encoders are not used.

What is needed is a circuit and method for image feature detection that has less circuitry and low power. The embodiments of the present disclosure answer these and other needs.

SUMMARY

In a first embodiment disclosed herein, a circuit for detecting features in an image comprises M time encoders, each time encoder having two inputs, $X_i$ and $T_i$, where $X_i$ is an ith element of an input vector $X_1 \ldots X_M$ of the image and $T_i$ is an ith element of a template vector $T_1 \ldots T_M$, and each time encoder having an oscillatory output, wherein when the input vector $X_1 \ldots X_M$ and the template vector $T_1 \ldots T_M$ are more matched, the oscillatory outputs of the time encoders are more synchronized, and wherein when the input vector $X_1 \ldots X_M$ and the template vector $T_1 \ldots T_M$ are less matched, the oscillatory outputs of the time encoders are less synchronized.

In another embodiment disclosed herein, a method for detecting features in an image comprises forming an input vector with M elements $X_1 \ldots X_M$ of the image, providing a template vector with M elements $T_1 \ldots T_M$, and forming M time encoders, each time encoder having two inputs, $X_i$ and $T_i$, where $X_i$ is an ith element of the input vector $X_1 \ldots X_M$ and $T_i$ is an ith element of the template vector $T_1 \ldots T_M$, and each time encoder having an oscillatory output, wherein when the input vector $X_1 \ldots X_M$ and the template vector $T_1 \ldots T_M$ are more matched, the oscillatory outputs of the time encoders are more synchronized, and wherein when the input vector $X_1 \ldots X_M$ and the template vector $T_1 \ldots T_M$ are less matched, the oscillatory outputs of the time encoders are less synchronized.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 7A, 7B, 7C and 7D show example waveforms for the time encoder based circuit in accordance with the present disclosure;

FIGS. 8A, 8B, 8C and 8D shows another set of example waveforms for the time encoder based circuit in accordance with the present disclosure;

FIGS. 9A and 9B show an input and a target, respectively, FIGS. 9C and 9D show the degree of match for two simulations, and FIG. 9E shows a final degree of match in accordance with the present disclosure;

FIGS. 10A and 10B show an input image being processed, FIG. 10C shows examples of three targets to detect three different types of features of the input, FIG. 10D shows example plots showing the degree of match produced, and FIG. 10E shows final images with extracted features in accordance with the present disclosure; and FIGS. 11 and 12 show flow diagrams of a method of detecting features in an image in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure describes a circuit based on a set of coupled time encoders that produce a set of asynchronous pulses. The closeness of an input vector and a template or target vector affect the synchronization of asynchronous pulses produced by the time encoders. The amount of synchronization may be detected and converted into an analog value and a binary value that shows how close the input is to the target. The circuit of the present disclosure may be implemented in an integrated circuit technology with less circuitry and less power than prior art approaches that use arithmetic algorithms and digital processing for image feature detection. The present disclosure describes circuitry and methods that determine how close an input and a template vector are without doing arithmetic operations. Rather relatively simple asynchronous pulse domain processing circuits are used.

Figure 1:
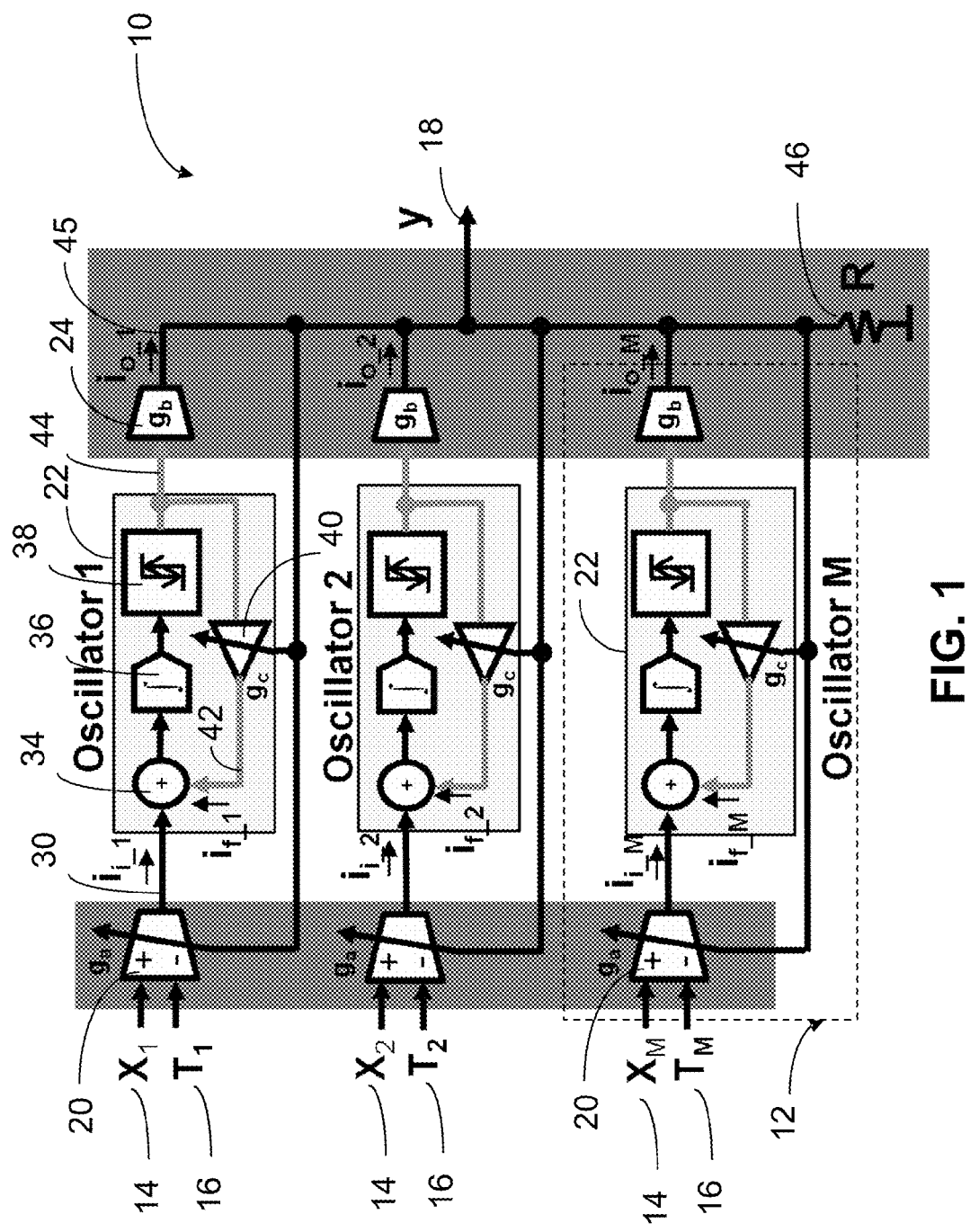
FIG. 1 shows a time encoder based circuit in accordance with the present disclosure.

FIG. 1 shows a time encoder based circuit 10 in accordance with the present disclosure. The time encoder based circuit 10 has an array of M time encoders 12. The time encoders 12 may be used to determine how close an input vector with M elements $X_1 \ X_M$ 14 is to a template or target vector with M elements $T_1 \ T_M$ 16. Each element of the vector $X_1 \ X_M$ 14 and each element of the vector $T_1 \ T_M$ 16 may have an analog value.

The time encoder based circuit 10 of FIG. 1 may be used for image processing applications. The input vector $X_1 \ X_M$ 14 may have analog values that correspond to M pixels of an input image. The target or template vector $T_1 \ T_M$ 16 may have the analog values of M pixels of a template or target image. The output y 18 of the time encoder circuit 10 indicates how closely the vector $X_1 \ X_M$ 14 and the vector $T_1 \ T_M$ match. When the input vector $X_1 \ X_M$ 14 and the template vector $T_1 \ T_M$ are more matched or more the same, outputs of the time encoders 12 are more synchronized. When the input vector $X_1 \ X_M$ 14 and the template vector $T_1 \ T_M$ are less the same or less matched, outputs of the time encoders 12 are less synchronized. The output y 18 is an oscillatory signal.

Each time encoder 12 of the array of M time encoder oscillators 12 has a transconductance amplifier 20, a time encoder oscillator 22, and a transconductance amplifier 24.

Each transconductance amplifier 20 has two inputs, $X_i$ and $T_i$, where $X_i$ is the ith element of the input vector $X_1 \ X_M$ 14 and $T_i$ is the ith element of the target or template vector $T_1 \ T_M$ 16. $X_i$ is connected to the positive input of the transconductance amplifier 20 and $T_i$ is connected to the negative input of the transconductance amplifier 20. The inputs to the transconductance amplifier 20, $X_i$ and $T_i$, are voltage inputs. The output $I_i$ 30 of the transconductance amplifier 20 is a current. The transconductance amplifier 20 has a variable gain, which is a function of feedback from output y 18 of the time encoder circuit 10.

Each time encoder oscillator 22 has a summer 34, an integrator 36, a hysteresis quantizer 38, and a 1 bit DAC 40 with variable gain that feedbacks back output 44 of the time encoder oscillator 22 to the summer 34.

The summer 34 sums an output $I_i$ 30 of the transconductance amplifier 20 with an output 42 of the 1 bit DAC 40, and the sum is integrated by integrator 36. The integrated sum is input to hysteresis quantizer 38, which has an output 44, which is an input to transconductance amplifier 24 and to the 1 bit DAC 40.

The summer may be implemented by connecting output $I_i$ 30 and output 42. The integrator 36 may be implemented by a capacitor. The hysteresis quantizer and the 1 bit DAC 40 may be implemented with CMOS transistors.

Each transconductance amplifier 24 converts an output 44, which is a voltage, into a current $I_{oi}$ 45. Each transconductance amplifier output $I_{oi}$ 45, which is the current output of the ith transconductance amplifier 24, is an asynchronous pulse type signal that has only two possible values: high and low. This type of signal, with only two binary amplitude values, can be implemented efficiently in CMOS technology with low voltage swings.

The currents $I_{oi}$ 45 of all the transconductance amplifiers 24 may be summed together by connecting the outputs of all the transconductance amplifiers 24 together. The connected outputs 45 of all the transconductance amplifiers 24 are connected to a resistor 46 connected to ground to form the voltage output y 18 of the time encoder circuit 10.

The output y 18 is fed back to the transconductance amplifiers 20 and to the 1 bit DACs 40. This feedback adjusts the gain of each input transconductance amplifier 20 and the gain of each 1 bit DAC 40 of each time encoder 12. Because the same feedback is to each time encoder 12, the coupling between the time encoders 12 is more than would be the case without the feedback.

Figure 2:
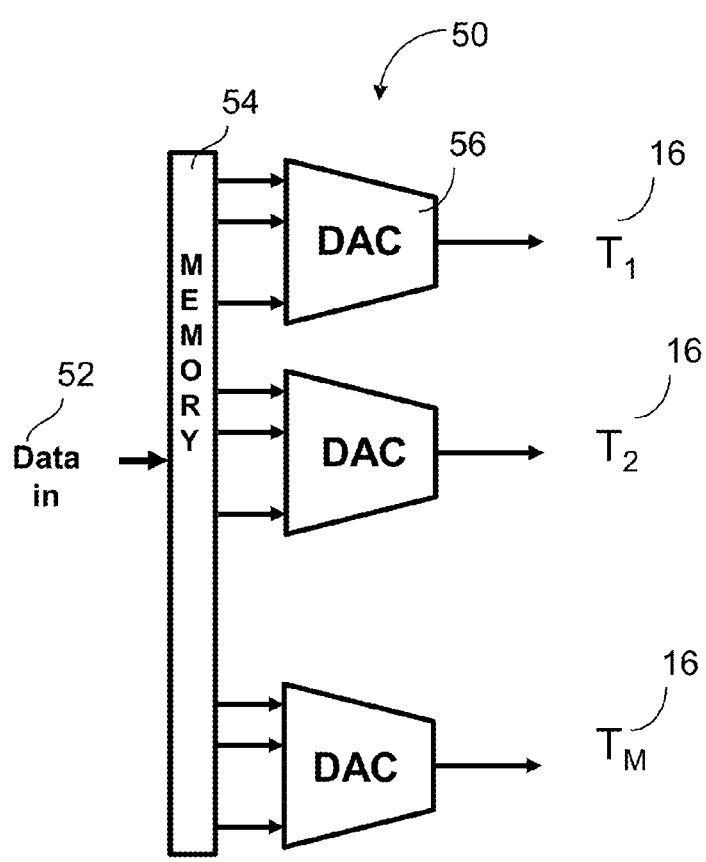
FIG. 2 shows a template memory in accordance with the present disclosure.

A template memory 50 may be provided to store a set of template vectors $T_1 \ T_M$ 16. Each element $T_i$ may be an analog value, so the template memory 50 may include circuitry to convert a digital value of the $T_i$ element to an analog form. As shown in FIG. 2, data in 52 may be used to select a template vector $T_1 \ T_M$ 16 from a memory 54, which stores the template vector $T_1 \ T_M$ 16 in binary form, and which may be a random access memory. Digital to analog converters (DACs) 56 may be connected to the memory 54 to form the analog template vector $T_1 \ T_M$ 16, which is input to the time encoders 12. Each DAC has typically from 3 to 8 bits, and each DAC produces an analog voltage signal.

An output circuit 60 may be used to convert the oscillatory signal y 18 into a binary signal that is high high when X is close to T and that is low when X is not close to T.

Figure 3A:
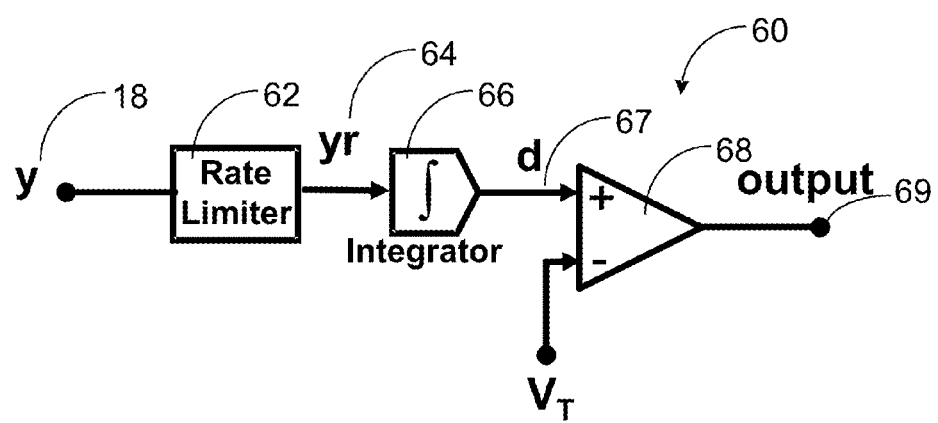
FIG. 3A shows an output circuit.

As shown in FIG. 3A, the output circuit 60 has a rate limiter 62, which rectifies the signal y 18. The output of the rate limiter 62, which is yr 64, follows y 18 when y is rising. However, when y 18 is a falling signal the output yr 64 does not decrease faster than a given rate. Typically yr 64 is a voltage signal that can be positive or negative. The voltage signal yr 64 is connected to an integrator 66, which may be implemented with a capacitor. The output d 67 of the integrator 66 is a signal that typically grows over time. The amount of increase over a fixed period of time is related to how close input vector $X_1 \ X_M$ 14 is to template vector $T_1 \ T_M$ 16. A comparator 68 having an input from the integrator, or output d 67, and a threshold voltage input converts the analog signal d 67 into a binary output signal 69. When the output d 67 is greater than the threshold voltage then the input vector $X_1 \ X_M$ 14 is a closer match to the template vector $T_1 \ T_M$ 16. When the output d 67 is less than the threshold voltage then the input vector $X_1 \ X_M$ 14 is less closely matched to the template vector $T_1 \ T_M$ 16.

Figure 3B:
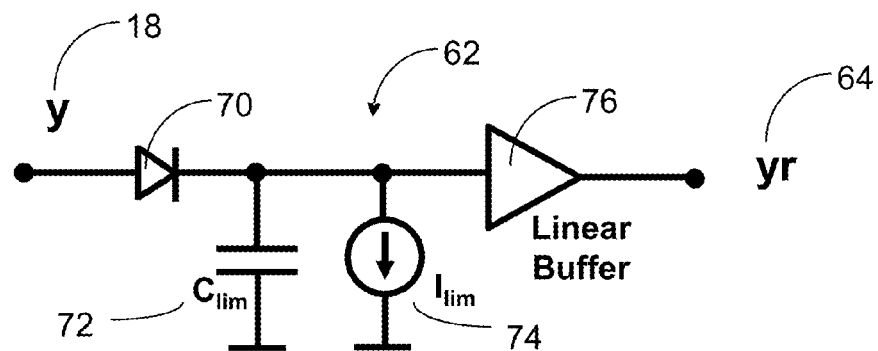
FIG. 3B shows the rate limiter of FIG. 3B in accordance with the present disclosure.

FIG. 3B shows an embodiment of the rate limiter 62, which has an inverter 70, connected to a capacitor 72 and a current source 74 connected in parallel to ground, and to a buffer amplifier 76. The capacitor 72 and the current source 74 allow the output yr 64 of the rate limiter 62 to rise as y 18 rises. However, when y 18 is a falling signal the output yr 64 does not decrease faster than allowed by the current source 74.

Figure 4:
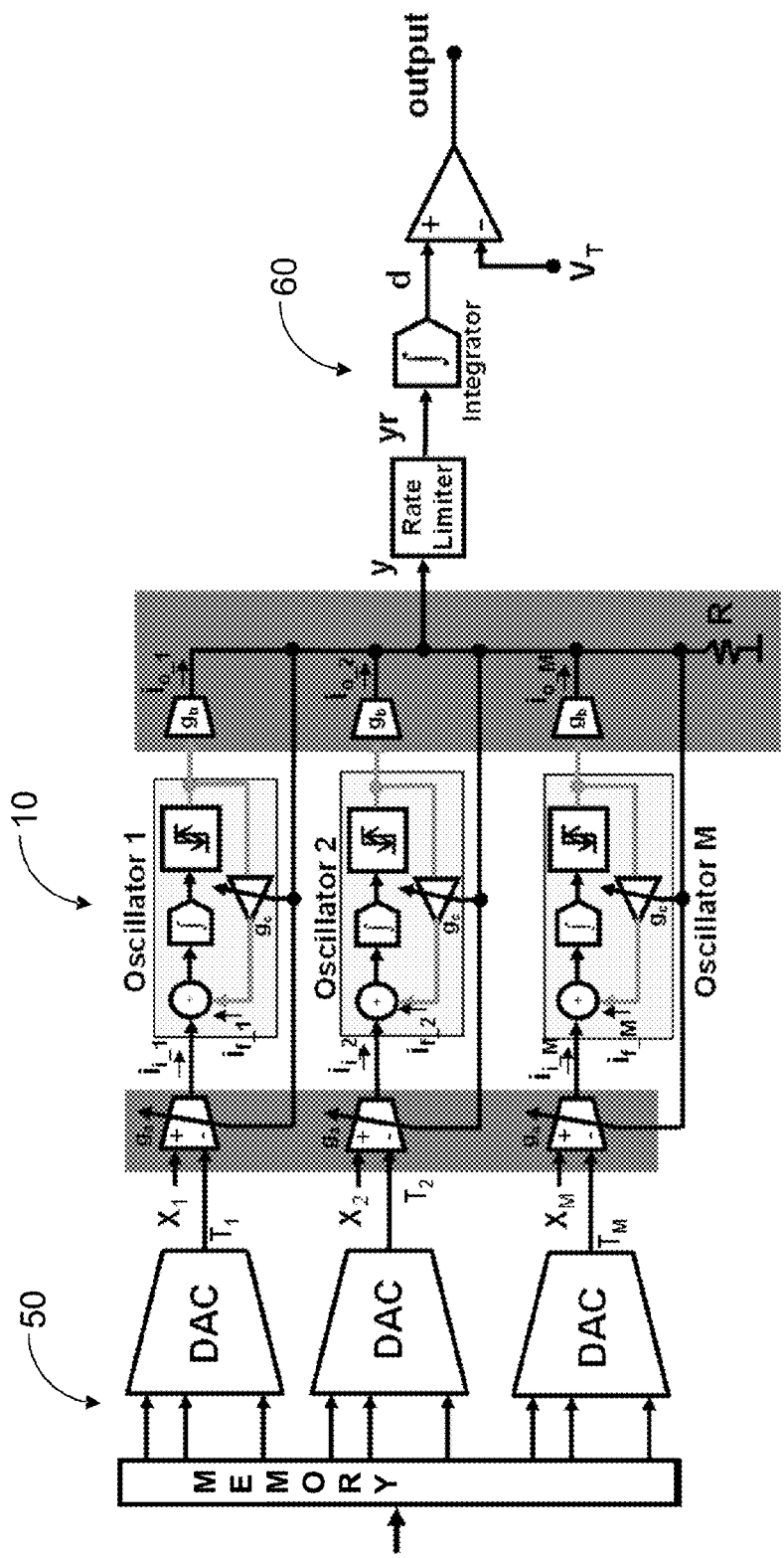
FIG. 4 shows the time encoder based circuit of FIG. 1 with the template memory circuit of FIG. 2B and the output peripheral circuit of FIG. 3A in accordance with the present disclosure.

FIG. 4 shows a diagram of the template memory 50, time encoder circuit 10, and output circuit 60 integrated together.

Figure 5:
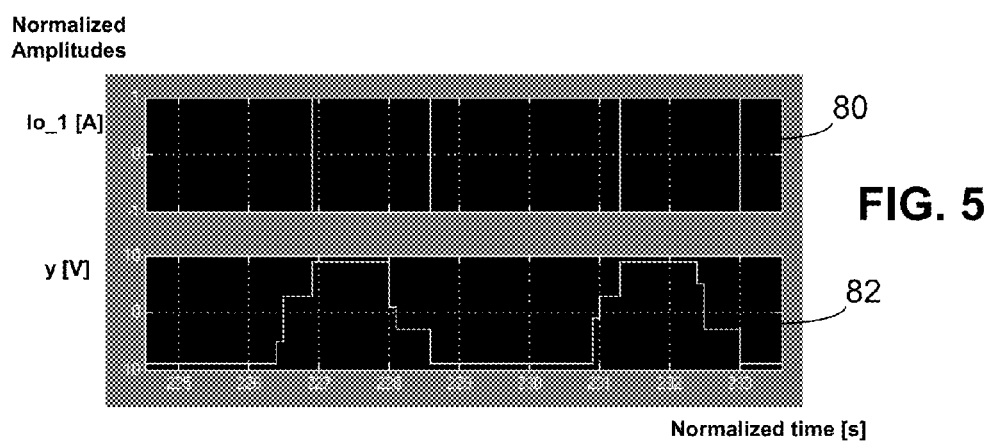
FIG. 5 shows example waveforms for the circuit of FIG. 4 in accordance with the present disclosure.

FIG. 5 shows an example of the waveforms produced by the time encoder circuit 10. The top graph 80 of FIG. 5 shows the signal current $I_{oi}$ 45 produced by one transconductance amplifier 24 connected at the output of one time encoder 12. The waveform is an asynchronous pulse signal. The bottom graph 82 shows the signal y 18 that corresponds to sum of nine signal currents $I_{oi}$ 45, which are converted to voltage by resistor 46. This signal y 18, as discussed above with reference to the output circuit of FIG. 3, may be used to determine the degree of match of the input patch and the target.

The operation circuit of the time encoder circuit 10 may be illustrated with several simulation examples. In the following simulation examples, there are nine (9) time encoders 12 and M equals 9.

Figure 6A:
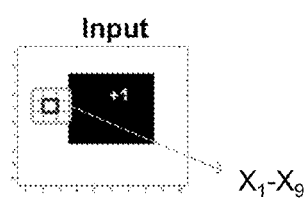
FIGS. 6A and 6B show example input images and FIG. 6C shows an example target image in accordance with the present disclosure.
Figure 6B:
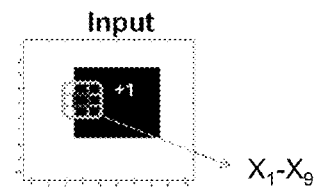
Figure 6C:
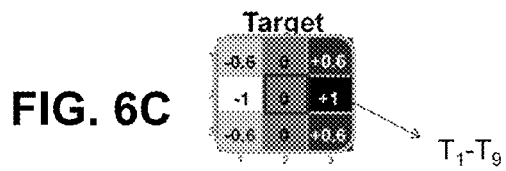

FIG. 6A shows an example of an input image with 10×10 pixels. The time encoder based circuit 10, shown in FIG. 1, with M=9, processes a patch of M pixels of the input image at a time. For the case of M=9 this corresponds to a patch of 3×3 pixels of the input image, or $X_1 \ldots X_9$ 14, as shown in FIG. 6A. The time encoder circuit 10 processes one patch of pixels at a time. FIG. 6B shows a different patch of pixels of the same image used to generate $X_1 \ldots X_9$ 14. FIG. 6C shows an example of a template or target vector $T_1 \ldots T_9$ 16. For the case of M=9 the target or template is a 3×3 vector.

The pixels may be grey encoded. A black pixel may be set to correspond to a signal $X_i$ of +1V. A white pixel may be set to correspond to a signal $X_i$ of 1V. Different levels of grey may correspond to voltages in the range of 1V to +1V.

FIGS. 7A to 7C show example waveforms of the outputs 44 of the oscillators 22, the output y 18, and the rate limiter output yr 64, respectively, for the input image 3×3 vector X of FIG. 6A and the template T of FIG. 6C. FIGS. 7A and 7B show that the outputs 44 of the oscillators 22 and the output y 18 are oscillatory signals.

FIG. 7A shows outputs 44 of the 9 oscillators 22 superimposed. FIG. 7B shows the signal y 18, and FIG. 7C shows the signal yr. FIG. 7D shows the signal d 67, which is the degree of match (dom). As shown in FIG. 7D the signal d 67 increases over time due to integrator 66.

FIGS. 8A to 8D show another example of the waveforms produced by the time encoder circuit. In this example the input image vector is the 3×3 vector X shown in FIG. 6B and the template T is shown in FIG. 6C.

In the simulation of FIGS. 8A to 8D the input vector X is closer to template T than the simulation shown in FIGS. 7A to 7D, so the dom should be higher. As shown the degree of match (dom) in FIG. 8D is 1790, which is higher than the dom of 1491 shown in FIG. 7D.

In the simulation of FIGS. 8A to 8D, in which X and T are closer matches, the oscillators are more synchronized than in the case of the X and T for the simulation of FIGS. 7A to 7D. The signal y 18, shown in FIG. 8B has a larger amplitude than in signal y 18 in FIG. 7B. The signal yr 64 shown in FIG. 8B has a larger amplitude than in the signal yr 64 of FIG. 7B. The slope of signal d 67 in FIG. 8D is steeper than in FIG. 7D. The final degree of match (dom) value of 1790 is larger in FIG. 8D than the 1491 in FIG. 7D, as should be the case.

FIGS. 9A to 9E show an example of 100 simulations of the time encoder circuit 10. FIG. 9A shows an image with 100 pixels. For each simulation a patch of 3×3 pixels is selected as input X. For each simulation of the 100 simulations, the 3×3 input vector patch is centered around a different one of the 100 pixels of the input image. FIG. 9B shows the template or target vector. The same target is used for all the 100 simulations. FIGS. 9C and 9D show the dom signals for two of the simulations, which are the same as FIGS. 7D and 8D. FIG. 9E shows the final dom (degree of match) image for the 100 simulations. In this image the intensity of each pixel encodes the dom of each simulation. This dom image can be used to extract features of the input image.

The time encoder circuit has been simulated for different types of templates or targets. FIGS. 10A to 10D show the case in which we use targets to find three different types of edges in an input image. FIG. 10A shows an example of an input image with 10×10 pixels. Black pixels are encoded as +1V and white pixels are encoded as 1V. In the simulations the input image of FIG. 10A is padded with a border of pixels of value 0 to produce a slightly larger 12×12 pixel intermediate image, as shown in FIG. 10B. The intermediate image is loaded into the time encoder circuit in patches of 3×3 pixels at a time.

FIG. 10C shows three different target vectors, each of which have 3×3 pixels. Each target can be used to detect one type of edge in the input image. The top target of FIG. 10C detects "west edges" (vertical edges that are dark on the right side and light in the left side) of the input image. The middle target of FIG. 10C detects "south edges", and the bottom target of FIG. 10C detects "east edges".

FIG. 10D shows three plots that show the simulated "dom" (degree of match) values produced by the cluster of 9 time encoders 12. Each plot was generated with the same input image but with a different target vector. Each pixel of the plots was generated by simulating the cluster for about 50 oscillations or cycles. Darker pixels indicate higher values of the "dom". The plots of FIG. 10D have been converted to binary intensity images that indicate whether or not a "dom" value exceeds a threshold value.

FIG. 10E shows the final binary images. The black pixels correspond to "dom" values exceeding the threshold. In the three cases the final images contain the desired extracted edge featured of the input image.

FIGS. 11 and 12 show flow diagrams of a method of detecting features in an image.

In step 100 of FIG. 11, an input vector with M elements $X_1 \ldots X_M$ of the image is formed. Then in step 102 a template vector with M elements $T_1 \ldots T_M$ is provided. Next in step 104 M time encoders are formed, each time encoder having two inputs, $X_i$ and $T_i$, where $X_i$ is an ith element of the input vector $X_1 \ldots X_M$ and $T_i$ is an ith element of the template vector $T_1 \ldots T_M$, and having an oscillatory output. As shown in step 106, when the input vector $X_1 \ldots X_M$ and the template vector $T_1 \ldots T_M$ are more matched, the oscillatory outputs of the time encoders are more synchronized, and when the input vector $X_1 \ldots X_M$ and the template vector $T_1 \ldots T_M$ are less matched, the oscillatory outputs of the time encoders are less synchronized.

The method may further include the steps shown in FIG. 12. In step 200 each time encoder output is summed together to formed a summed output. Then in step 202 the summed output is converted into a binary signal that is high when the input vector $X_1 \ldots X_M$ is more closely matched to the template vector $T_1 \ldots T_M$ and that is low when the input vector $X_1 \ldots X_M$ is less closely matched to the template vector $T_1 \ldots T_M$.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A circuit for detecting features in an image, the circuit comprising:
   M time encoders, each time encoder having two inputs, $X_i$ and $T_i$, where $X_i$ is an ith element of an input vector $X_1 \ldots X_M$ of the image and $T_i$ is an ith element of a template vector $T_1 \ldots T_M$, and each time encoder having an oscillatory output;
   wherein when the input vector $X_1 \ldots X_M$ and the template vector $T_1 \ldots T_M$ are more matched, the oscillatory outputs of the time encoders are more synchronized; and
   wherein when the input vector $X_1 \ldots X_M$ and the template vector $T_1 \ldots T_M$ are less matched, the oscillatory outputs of the time encoders are less synchronized.

2. The circuit of claim 1 wherein each time encoder comprises:
   a first transconductance amplifier, having two inputs, $X_i$ and $T_i$, where $X_i$ is an ith element of the input vector $X_1 \ldots X_M$ and $T_i$ is an ith element of the template vector $T_1 \ldots T_M$;
   a time encoder oscillator coupled to the first transconductance amplifier; and
   a second transconductance amplifier coupled to the time encoder oscillator, wherein an output of the second transconductance amplifier is the output of the time encoder.

3. The circuit of claim 2 wherein each time encoder oscillator comprises:
   a summer having a first summer input coupled to an output of the first transconductance amplifier;
   an integrator coupled to an output of the summer;
   a hysteresis quantizer coupled to an output of the integrator; and
   a 1 bit digital to analog converter (DAC) coupled to an output of the hysteresis quantizer, the 1 bit DAC having an output coupled to a second summer input of the summer.

4. The circuit of claim 2:
   wherein each time encoder output is summed with each other time encoder output to formed a summed output; and
   the circuit further comprises a resistor connected to the summed output and to a ground.

5. The circuit of claim 4 wherein:
   the summed output is coupled to the 1 bit DAC for varying a gain of the 1 bit DAC; and the summed output is coupled to the first transconductance amplifier for varying a gain of the first transconductance amplifier.

6. The circuit of claim 3 wherein the summer comprises a wired connection between the output of the first transconductance amplifier and the output of the 1 bit DAC.

7. The circuit of claim 3 wherein the integrator comprises a capacitor.

8. The circuit of claim 1 further comprising:
   an addressable memory for digitally storing a plurality of template vectors $T_1 \ldots T_M$; and
   at least one digital to analog converter coupled to the memory for converting a stored template vector to the template vector $T_1 \ldots T_M$, the at least one digital to analog converter coupled to the first transconductance amplifier.

9. The circuit of claim 4 further comprising:
   an output circuit for converting the summed output into a binary signal that is high when the input vector $X_1 \ldots X_M$ is more closely matched to the template vector $T_1 \ldots T_M$ and that is low when the input vector $X_1 \ldots X_M$ is less closely matched to the template vector $T_1 \ldots T_M$.

10. The circuit of claim 9 wherein the output circuit comprises:
    a rate limiter for rectifying the summed output and having a rate limiter output that increases when the summed output is increasing and that decreases at a given rate when the summed output is decreasing;
    an integrator coupled to the rate limiter output; and
    a comparator coupled to an output of the integrator and to a threshold voltage for converting an output of the integrator to a binary output signal.

11. The circuit of claim 10 wherein the rate limiter comprises:
    an inverter;
    a capacitor coupled to the inverter and to a ground;
    a current source in parallel with the capacitor coupled to the inverter and to the ground; and
    a buffer amplifier coupled to the inverter, the capacitor and the current source.

12. A method for detecting features in an image, the method comprising:
    forming an input vector with M elements $X_1 \ldots X_M$ of the image;
    providing a template vector with M elements $T_1 \ldots T_M$; and
    forming M time encoders, each time encoder having two inputs, $X_i$ and $T_i$, where $X_i$ is an ith element of the input vector $X_1 \ldots X_M$ and $T_i$ is an ith element of the template vector $T_1 \ldots T_M$, and each time encoder having an oscillatory output;
    wherein when the input vector $X_1 \ldots X_M$ and the template vector $T_1 \ldots T_M$ are more matched, the oscillatory outputs of the time encoders are more synchronized; and
    wherein when the input vector $X_1 \ldots X_M$ and the template vector $T_1 \ldots T_M$ are less matched, the oscillatory outputs of the time encoders are less synchronized.

13. The method of claim 12 wherein each time encoder comprises:
    a first transconductance amplifier, having two inputs, $X_i$ and $T_i$, where $X_i$ is an ith element of the input vector $X_1 \ldots X_M$ and $T_i$ is an ith element of the template vector $T_1 \ldots T_M$;
    a time encoder oscillator coupled to the first transconductance amplifier; and
    a second transconductance amplifier coupled to the time encoder oscillator, wherein an output of the second transconductance amplifier is the output of the time encoder.

14. The method of claim 13 wherein each time encoder oscillator comprises:
a summer having a first summer input coupled to an output of the first transconductance amplifier;
an integrator coupled to an output of the summer;
a hysteresis quantizer coupled to an output of the integrator; and
a 1 bit digital to analog converter (DAC) coupled to an output of the hysteresis quantizer, the 1 bit DAC having an output coupled to a second summer input of the summer.

15. The method of claim 13 further comprising:
summing together each time encoder output to formed a summed output.

16. The method of claim 15 wherein:
the summed output is coupled to the 1 bit DAC for varying a gain of the 1 bit DAC; and
the summed output is coupled to the first transconductance amplifier for varying a gain of the first transconductance amplifier.

17. The method of claim 14 wherein the summer comprises a wired connection between the output of the first transconductance amplifier and the output of the 1 bit DAC.

18. The method of claim 14 wherein the integrator comprises a capacitor.

19. The method of claim 12 further comprising:
digitally storing a plurality of template vectors $T_1\ T_M$; and
converting a stored template vector to the template vector $T_1\ T_M$.

20. The method of claim 15 further comprising:
converting the summed output into a binary signal that is high when the input vector $X_1\ X_M$ is more closely matched to the template vector $T_1\ T_M$ and that is low when the input vector $X_1\ X_M$ is less closely matched to the template vector $T_1\ T_M$.

21. The method of claim 15 further comprising:
rectifying the summed output to form a rate limited output that increases when the summed output is increasing and that decreases at a given rate when the summed output is decreasing;
integrating the rate limited output; and
comparing the integrated rate limited output to a threshold for converting an output of the integrator to a binary output signal;
wherein the binary signal is high when the input vector $X_1\ X_M$ is more closely matched to the template vector $T_1\ T_M$ and is low when the input vector $X_1\ X_M$ is less closely matched to the template vector $T_1\ T_M$.

* * * * *